May 6, 1924.
L. HAUBERT
COMB
Filed Sept. 22, 1923
1,493,342
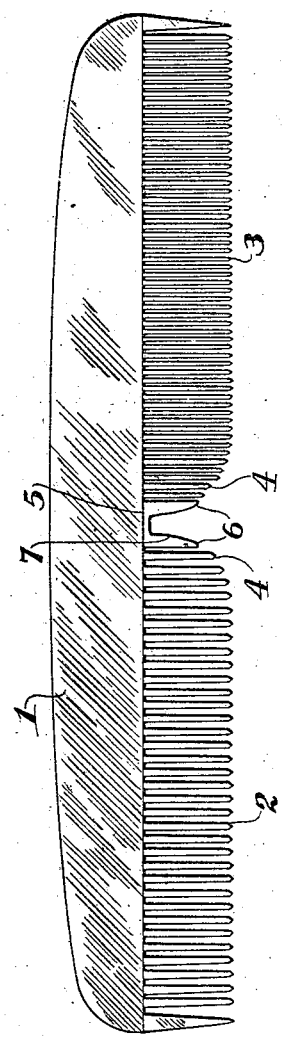
Leo Haubert
INVENTOR Patented May 6, 1924.

1,493,342

UNITED STATES PATENT OFFICE.

LEO HAUBERT, OF MUSKOGEE, OKLAHOMA.

COMB.

Application filed September 22, 1923. Serial No. 664,228.

*To all whom it may concern:*

Be it known that I, LEO HAUBERT, a citizen of the United States, residing at Muskogee, in the county of Muskogee and State of Oklahoma, have invented a new and useful Comb, of which the following is a specification.

This invention relates to combs of the style which comprises a series of coarse teeth projecting from one half of the comb, and a series of fine teeth projecting from the other half.

In this style of comb, the teeth at the center, where the two series meet, are usually the first to be broken, and the object of the present invention is to provide a comb in which this tendency to break at the center is eliminated, at the same time providing a convenient rounded opening, which makes it more convenient to use the comb behind one's ear.

The detailed construction of the invention, as well as the advantages thereof, will be more clearly understood from the accompanying drawing, the single figure of which shows in side elevation a comb comprising the invention.

Referring more specifically to the drawing, the comb comprises a back 1, from which project series of coarse teeth 2 and fine teeth 3, respectively. The adjacent ends of these two series of teeth are separated by a distance which is several times the distance between two adjacent teeth. The ends of the teeth are in a line which is straight throughout the major portion of its length, but curves inwardly as it approaches the center of the comb. That is, a number of teeth at the inner end of each series become successively shorter, as indicated at 4. Between the last teeth of the two series is located a U-shaped tooth 5, having its prongs 6 closely adjacent the respective end teeth of the series 2 and 3, and having their inner sides rounded, as at 7, so that a space is formed between the two series of teeth adapted to receive the ear, when the comb is used behind the same. The prongs 6 are made comparatively thick so that they are not likely to break, and the end teeth 4 are protected by the prongs 6 and consequently less likely to break.

Thus, the invention serves a dual purpose. It provides a comb in which the central teeth are not easily broken, and it provides a means for conveniently combing the hair immediately behind the ears.

While I have illustrated the invention in its preferred form, it is to be understood that this is merely illustrative, and that minor modifications may be made in the size, shape and relative arrangement of the teeth without departing from the spirit of the invention.

What is claimed is:

1. A comb having a series of coarse teeth and a series of fine teeth, the ends of the teeth being in a line which is straight for the major portion of its length, but curves inwardly as it approaches the center of the comb.

2. A comb having two series of teeth arranged in the same plane, the ends of the teeth being in a line which is straight for the major portion of its length, but curves inwardly as it approaches the center of the comb, the adjacent ends of the two series being separated by several times the distance between adjacent teeth of the series, and a central U-shaped tooth occupying the greater part of the space between the adjacent ends of the series, the prongs of the U-shaped tooth being shorter than the teeth proximate thereto.

3. A comb having two series of teeth arranged in the same plane, the ends of the teeth being in a line which is straight for the major portion of its length, but curves inwardly as it approaches the center of the comb, the adjacent ends of the two series being separated, and a central U-shaped tooth occupying the space between the adjacent ends of the series, the prongs of the U-shaped tooth being shorter than the teeth proximate thereto.

In testimony, that I claim the foregoing as my own, I have hereto affixed my signature.

LEO HAUBERT.